US011567970B2

(12) United States Patent
Aasman et al.

(10) Patent No.: US 11,567,970 B2
(45) **Date of Patent: *Jan. 31, 2023**

(54) SEMANTIC INDEXING ENGINE

(71) Applicant: FRANZ, INC, Lafayette, CA (US)

(72) Inventors: Jannes Aasman, Oakland, CA (US); Marc C Hadfield, New York, NY (US); Parsa Mirhaji, Scarsdale, NY (US)

(73) Assignee: Franz, Inc., Oakland, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 17/068,715

(22) Filed: Oct. 12, 2020

(65) Prior Publication Data

US 2021/0026868 A1 Jan. 28, 2021

Related U.S. Application Data

(63) Continuation of application No. 15/619,452, filed on Jun. 10, 2017, now Pat. No. 10,803,088, which is a continuation of application No. 14/579,589, filed on Dec. 22, 2014, now Pat. No. 9,679,041.

(51) Int. Cl.
*G06F 16/27* (2019.01)
*G06F 16/2453* (2019.01)

(52) U.S. Cl.
CPC ...... *G06F 16/278* (2019.01); *G06F 16/24532* (2019.01)

(58) Field of Classification Search
USPC .................................................. 707/603, 803
See application file for complete search history.

(56) References Cited

U.S. PATENT DOCUMENTS 7,028,057 B1 * 4/2006 Vasudevan .......... G06F 16/2474 707/695
7,809,763 B2 * 10/2010 Nori ...................... G06F 16/213 707/802
7,836,028 B1 * 11/2010 Agarwal ............ G06F 16/2477 707/695
7,890,518 B2 * 2/2011 Aasman ................. G06F 16/28 707/752
8,037,108 B1 * 10/2011 Chang .................. G06F 17/303 707/803
9,189,509 B1 * 11/2015 Tsypliaev .......... G06F 17/30327
(Continued)

*Primary Examiner* — Cam Linh T Nguyen
(74) *Attorney, Agent, or Firm* — Staniford Tomita LLP

(57) ABSTRACT

Embodiments are described for a method of distributing n-tuples over a cluster of triple-store machines, by storing each n-tuple as text in a distributed file system using a key value store; providing each machine of the cluster with a resident semantic data lake component accessing one or more persistent RDF triplestores for the n-tuple data stored on each machine; and defining one part of each n-tuple as a partition variable to ensure locality of data within each respective n-tuple. A method includes inserting graphs into a key/value store to determine how the key/value store distributes the data across a plurality of servers, by generating textual triple data, and storing the triple data in key-value stores wherein a fourth element of the triple comprises the key, and a value associated with the key comprises all the triples about a subject; indexing the data in the key-value store in an RDF triplestore using a partition based on the fourth element.

8 Claims, 9 Drawing Sheets

INGEST A PLURALITY OF TRIPLES COMPRISING DATA ELEMENTS AND A GRAPH CONTEXT 820

GENERATE HASH VALUE FROM GRAPH CONTEXT FOR EACH TRIPLE 822

SEND GRAPHS TO SERVER NODES BASED ON ASSIGNMENT BY HASH VALUE 824

INDEX TRIPLES AT THE SERVER NODES 826

SEND QUERIES TO SERVER NODES IN PARALLEL OR FEDERATED MANNER 828

(56) References Cited

U.S. PATENT DOCUMENTS

2003/0023609 A1* 1/2003 Della-Libera ......... G06F 16/972
2003/0229610 A1* 12/2003 Van Treeck ....... G06F 17/30557
2005/0149484 A1* 7/2005 Fox .................. G06F 17/30557
2006/0230063 A1* 10/2006 Pollinger .......... G06F 17/30607
2008/0301094 A1* 12/2008 Zhu .................. G06F 17/30716
2009/0012842 A1* 1/2009 Srinivasan ........ G06F 17/30684 705/12
2009/0164943 A1* 6/2009 Ryan ................. G06F 17/30286 715/810
2010/0083285 A1* 4/2010 Bahat ................ G06F 17/30997 719/328
2010/0228764 A1* 9/2010 Sallakonda ......... G06F 17/3051 707/769
2012/0310916 A1* 12/2012 Abadi ............... G06F 17/30445 707/713
2014/0201126 A1* 7/2014 Zadeh .................... G06N 7/005 706/52
2014/0279837 A1* 9/2014 Guo ...................... G06F 16/282 707/603
2015/0160988 A1* 6/2015 Scomparim ............... G06F 7/00 719/318
2016/0004696 A1* 1/2016 Trenkov .............. G06F 17/2785 707/760
2016/0055184 A1* 2/2016 Fokoue-Nkoutche ....................... G06F 16/2282 707/809
2016/0132572 A1* 5/2016 Chang ............... G06F 17/30569 707/723
2016/0170814 A1* 6/2016 Li ........................... G06F 9/542 719/318

* cited by examiner

400

| ELEMENT 1 | ELEMENT 2 | ELEMENT 3 | **GRAPH CONTEXT** Data Partition Element 402 | **HASH VALUE** Data Distribution Element 404 |
|---|---|---|---|---|

600

SEMANTIC INDEXING ENGINE

FIELD OF THE INVENTION

Embodiments are generally directed to large-scale data processing, and more specifically to distributing and processing RDF triples over a cluster of machines.

BACKGROUND

Analyzing large data sets has become an increasingly critical task as the amount of digital data increases at extreme rates. The term "big data" refers to data sets that are so large and complex that traditional data processing methods are rendered impractical. New developments in the field of machine processing include the Semantic Web, which is a structure of linked data that provides a common framework to allow data to be shared and reused across application and enterprise boundaries, and facilitate intelligent machine processing of the data. The Semantic Web framework refers to or includes certain formats and technologies that enable the collection, structuring, and processing of linked data. These include the Resource Description Framework (RDF), which is a simple language for expressing data models; RDF Schema (RDFS), which is a vocabulary for describing properties and classes of RDF-based resources; Web Ontology Language (OWL), which is a query language for semantic web data sources; SPARQL, which is an RDF query language; N-triples, which a format for storing and transmitting data; Rule Interchange Format (RIF), which is a framework of web rule language dialects supporting rule interchange on the Web; and other technologies.

As the amount and type of web data explodes, software agents used by data processing engines need a query capability that supports a combination of description, logic, geospatial and temporal reasoning, and social network knowledge. Depending on the data application, vendors may use large data warehouses with disparate RDF-based triple stores that describe various events, objects, or data elements. Such data may be stored in or across a vast array of disks or other memory storage devices such that traditional storage techniques and query tools are required to search over a large number of disks to return a result. Clearly, this can lead to excessively long searches in the case of large data sets. What is needed, therefore, is a method and system to partition data in such a way that optimizes data queries and takes full advantage of the data linkage mechanisms of the Semantic Web. What is further needed is an efficient way to join data elements from one data set with data elements in another data set to perform a query simultaneously. In general, in a parallel query the same query is sent to different self-contained databases and the results are collected. In the parallel system, the data is partitioned and each data partition is self-contained and the same query is performed against each data partition. In federation, data elements in one database are joined or connected with data elements in another database. In a federated query, the query is sent to one of the databases, and data connection routes the low-level parts of the query through the other data partitions.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numbers are used to refer to like elements. Although the following figures depict various examples, the one or more implementations are not limited to the examples depicted in the figures.

SUMMARY OF EMBODIMENTS

Figure 1:
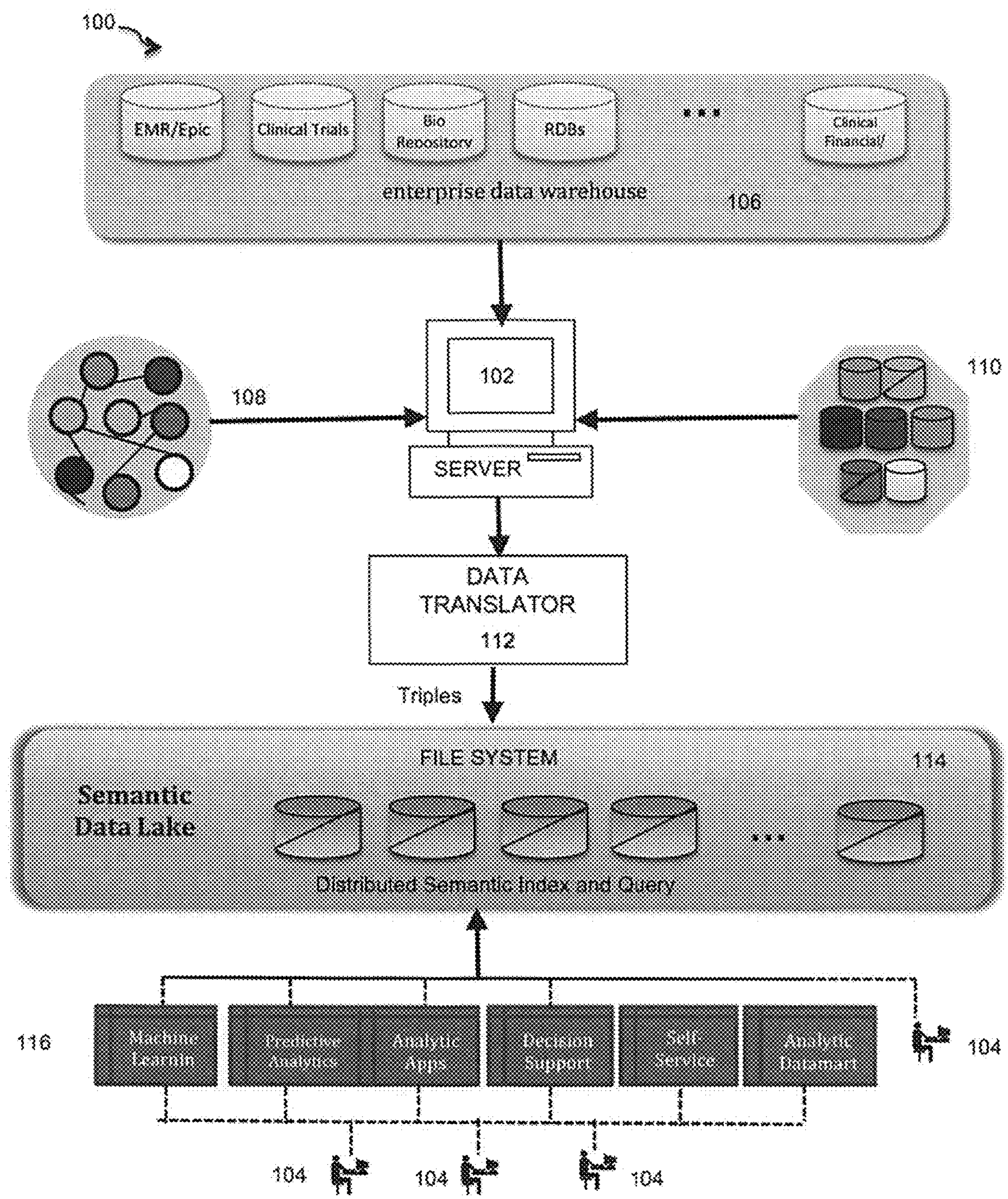
FIG. 1 illustrates a data processing system that implements embodiments of a semantic indexing and query engine, under some embodiments.

Embodiments are directed to a system for and method for providing fast data analytic processes for big data applications. A method under embodiments distributes n-tuples over a cluster of triple-store machines by storing each n-tuple as text in a distributed file system using a key value store; providing each machine of the cluster with a resident semantic data lake component accessing one or more persistent RDF triplestores for the n-tuple data stored on each machine; and defining one part of each n-tuple as a partition variable to ensure locality of data within each respective n-tuple. In an embodiment, each n-tuple is a Resource Description Framework (RDF) triple comprising four parts, with three parts comprising a subject-predicate-object expression and a fourth part comprising the partition variable. Each part of the n-tuple may be encoded into a unique part identifier (UPI) comprising a tag indicating a data type of the encoded tuple part, and the UPI may comprise a binary representation of very long strings using a unified hashing mechanism to represent data. In an embodiment, the tuple structure is utilized by a web ontology language for processing of semantic web data, and wherein the data comprises a big data application comprising a collection of large complex data sets organized into one or more data libraries. The file system may be a Hadoop distributed file system (HDFS), and the key value stores are built on top of the HDFS. Alternatively, key value stores may be built on top of other types of file systems, other than HDFS.

The method may further comprise applying a machine learning process and predictive analytics processes using a data analytics cluster computing framework built on the HDFS. In an embodiment, the method further comprises indexing the n-tuple data in the HDFS using the semantic indexing engine, and maintaining synchronization of the n-tuple data between the HDFS and the semantic data lake component. The method may further comprise providing an interface allowing parallel queries wherein each server node of a cluster performs an identical query. A SPARQL language interface may be provided to query the key value data through each server node. The method may comprise providing an interface for a federated query that sends a query to a server node for processing through a plurality of joined datasets.

Embodiments are further directed to a method for facilitating fast data analytics for big data applications, comprising: encoding application data into a plurality of triple-stores; partitioning the application data for storage onto a plurality of machines using a fourth element of the triple stores; storing the partitioned data in in the form of key value stores in respective machines of the plurality of machines based on the fourth element; and storing the partitioned data as semantic indexed data in a RDF triplestore in each respective machine. The method may further comprise performing a parallel query on the semantic indexed data of the RDF triplestore in each respective machine. The key value stores may be stored in a Hadoop Distributed File System (HDFS), and the parallel query engine may comprise a SPARQL sequential query language based query engine.

Embodiments are yet further described for a method of inserting graphs into a key/value store to determine how the key/value store distributes the data across a plurality of servers by generating textual triple data, and storing the triple data in key-value stores wherein a fourth element of the triple comprises the key, and a value associated with the key comprises all the triples about a subject; indexing the data in the key-value store in an RDF triplestore using a partition based on the fourth element. This method may further comprise sending a same triple to both the key-value store and the partitioned RDF triplestore. The method may further comprise generating a distribution value for each triple by performing a hash operation on the fourth element, wherein the distribution value is used to distribute graphs among a plurality of server nodes; and the graphs may be distributed among the plurality of server nodes in one of: an equal distribution, and a distribution scheme configured to affect a load-balancing or resource optimization characteristic.

Embodiments are further directed to devices and systems for performing process elements of the above-described methods, as well as computer-readable media storing instructions that, when executed by a processor, perform the process steps of the above-described methods.

DETAILED DESCRIPTION

Embodiments are described for a system and method of distributing n-tuples over a cluster of triple-store machines by storing each n-tuple as text in a distributed file system using a key value store wherein one part of each n-tuple is defined as a partition variable, and providing each machine of the cluster with a resident semantic indexing engine accessing one or more persistent RDF triplestores for the n-tuple. The system also provides means for performing parallel queries in which a single query is performed by many (e.g., thousands) of machines and the results are combined to return an answer. Such a mechanism helps implement fast data analytic processes for big data applications.

Aspects of the one or more embodiments described herein may be implemented on one or more computers executing software instructions. The computers may be networked in a client-server arrangement or similar distributed computer network. FIG. 1 illustrates a data processing system that implements embodiments of a semantic indexing and query engine, under some embodiments. System 100 of FIG. 1 includes a computer network system that implements one or more embodiments. In system 100, a network server computer 102 or computers are coupled, directly or indirectly, to one or more network client computers 104 over a network. The network interface between server computer 102 and any client computer 104 may include one or more routers that serve to buffer and route the data transmitted between the server and client computers. The network may be the Internet, a Wide Area Network (WAN), a Local Area Network (LAN), or any combination thereof, or it may also represent a cloud-based network environment in which applications, servers and data are maintained and provided through a centralized cloud computing platform.

System 100 may be a client-server network of servers or coupled computers that store data in relational databases or other document stores. At least part of such a network can be an Internet Protocol (IP-based) network where one or more servers 102 store data in the form of web pages and transmits these pages as Hypertext Markup Language (HTML) files over the Internet to the client computers 104. For this embodiment, the client computers typically run web browser programs to access the web pages served by server computer 102 and/or any available content provider or supplemental server.

In one embodiment, server 102 in network system 100 is a server that executes a semantic annotation process (or engine). This process may represent one or more executable programs modules that are stored within network server 104 and executed locally within the server. Alternatively, however, it may be stored on a remote storage or processing device coupled to server 102 or the network and accessed by server 102 to be locally executed. In a further alternative embodiment, the process may be implemented in a plurality of different program modules, each of which may be executed by two or more distributed server computers coupled to each other, or to the network separately.

The server 102 processes data provided by one or more data warehouses or large data repositories 106, such as an enterprise data warehouse. The data may be stored in one or more data stores in the form of database data that is managed by a database management system (DBMS) that facilitates the definition, creation, modification, querying, and management of the data. The DBMS program may be a proprietary system or a commercially available product, such as those available from Oracle, SAP, Microsoft, and so on. The data may be specific to an enterprise or application, and for the example shown in FIG. 1, the data pertains to medical and health records, though any practical application may be used, such as social network information, banking information, e-commerce data, and so on. Besides the data stored in and provided by data warehouse 106, the server 102 may access other data sources, such as public domain, linked open data sources 108 or other external databases and knowledge bases 110. Such other data sources may provide data pertaining to certain industrial applications, such science, law, history, encyclopedic information, and other practical bodies of knowledge.

For the embodiment of FIG. 1, the one or more client computers 104 are operated by users that utilize certain applications to process the data 106. These include machine learning tools, predictive analytic tools, analytic applications, decision support tools, self-service tools, analytic datamart modules, and other similar applications. Each and any of the client computers 104 may be a workstation computer or a may be a computing device such as a notebook computer, personal digital assistant, or the like. The client computer may also be embodied within a mobile communication device, game console, media playback unit, or similar computing device that provides access to the Internet network and a sufficient degree of user input and processing capability to execute or access the data sources 106 and the server computer 102. The client computers 104 may be coupled to the server computer 102 over a wired connection, a wireless connection or any combination thereof.

As shown in FIG. 1, server computer 102 includes a data translator 112 that specifies how to translate data from relational databases (or any data source) into triples, it should be noted that the functionality of such a component is not the subject of the present invention. The data translator 112 interfaces to the application layer 116 and client computers 104 through a semantic data lake layer 114, which provides a file system, that in one embodiment, may comprise a Hadoop Distributed File System (HDFS). In general, the HDFS is a software framework for distributed storage and processing of big data on clusters of machines. The HDFS splits large files into large blocks, such as of size 64 MB or 128 MB, and distributes the blocks among nodes in a cluster. An associated programming model, such as MapReduce can be used to perform data processing, such as filtering and sorting the large data sets in parallel on a cluster. The file system layer 114 may include programs or other instruction processing units that perform semantic indexing and querying operations using key values stores.

Data is provided to the semantic data lake 114 in the form of triples, which may be sourced from any application or data source, such as enterprise data warehouse 106, or from other sources 108 and 110. Such data could be originally in appropriate triple format, or it may be translated into triples through data translator 112. In an embodiment, the data stored in the semantic data lake 114 is stored in the form of triple store data, such as RDF triples. In an embodiment, the data may use the Allegrograph RDF database format provided by Franz, Inc. Allegrograph implements the SPARQL protocol, which is a standard query language for linked data, although other database formats and query languages are also possible. Such a database may also be referred to as a "RDF triplestore" or "graph database."

Instead of RDF triples, the data in semantic data lake 114 may be stored in any appropriate n-tuple arrangement, such as triples, quads (4-tuples), quints (5-tuples), and so on.

Query Types

The data query performed in FIG. 1 may be a parallel query or a federated query. In a parallel query, the main query engine sends a SPARQL query to each partition (e.g., a set of Allegrographs). The main query engine receives the results from each partition and combines the result and applies aggregation functions to the combined results. In a federated query, the main query engine does not send the SPARQL query to each partition, but instead calls for results for each individual database. For example, when the process executes a regular SPARQL query, it calls the basic function get-triples for every clause in the SPARQL query, Thus, a query: select*{ ?x:hair-colour 'grey'; :lives-in ?place. ?place:name "NewYork"} translates into pseudocode as:

```
get-triples ?x :p :hair-colour :o 'grey'
    for-each ?x -> get-triples :s ?x :p :lives-in :o ?place .
        for-each ?place -> get-triples :s ?place :p :name :o "NewYork"
```

So, the SPARQL, query gets translated into something that has three invocations of get-triple functions. In a regular store get-triples is computed against one triple store, but in federation, the process actually calls get-triples for each individual database. In this case, the SPARQL engine is not aware that there is a federation underneath, it keeps calling get-triples like always but the underlying components will try to return results from the get-triples operation from each of the different databases.

Figure 2:
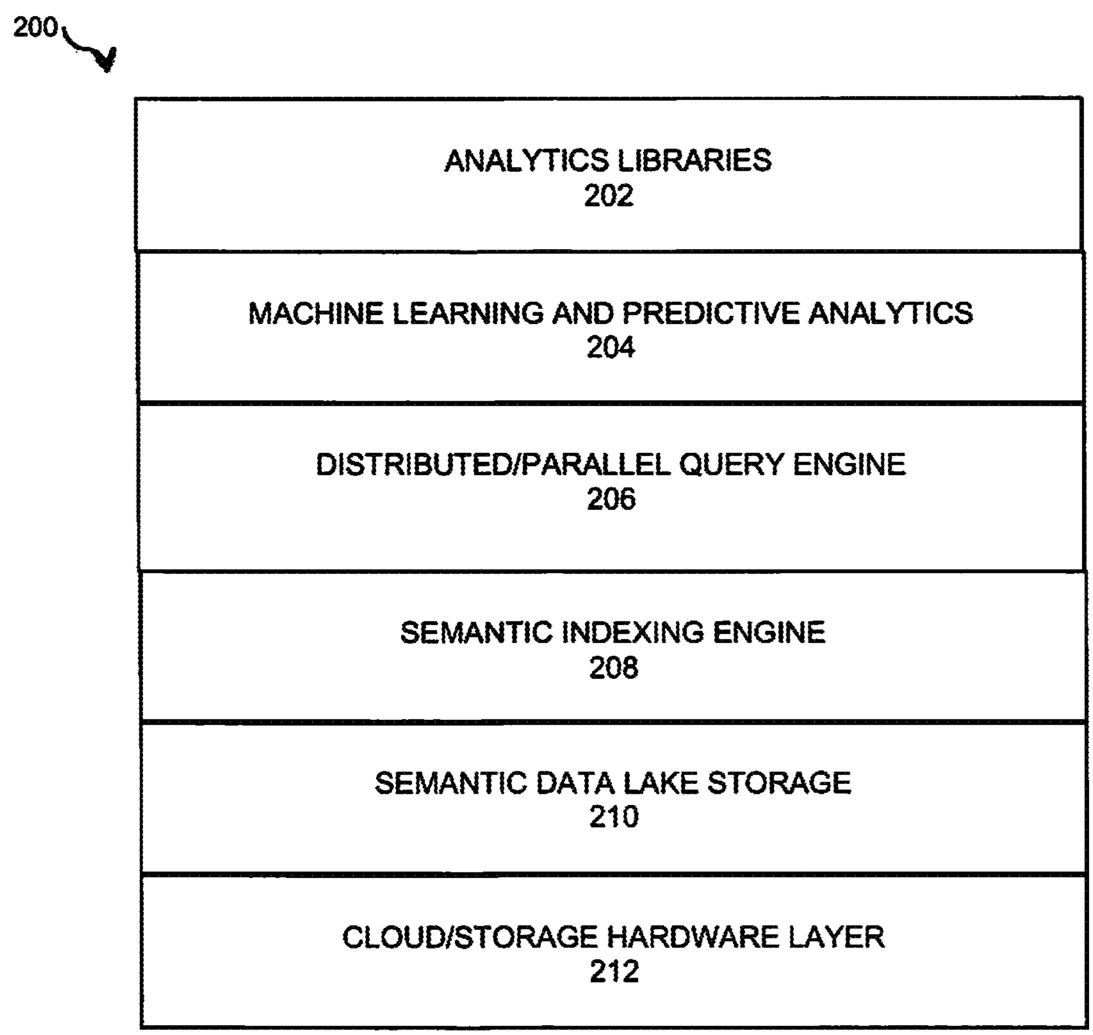
FIG. 2 illustrates a stack representation of functional components of a semantic indexing and query system, under an embodiment.

FIG. 2 illustrates a stack representation of functional components of a semantic indexing and query system, under an embodiment. The components shown in FIG. 2 represent functional units within data translator 112 of FIG. 1 or one or more of the applications of the applications layer 116. A top layer of the stack 200 comprises one or more analytics libraries 202, and uses certain machine learning and predictive analytics processes 204 that may be performed on these libraries. The analytics layer 204 uses a distributed/parallel query engine 206 to perform queries on the library data using a semantic indexing engine 208 that indexes the data, which is then stored as a semantic body of data in semantic data lake storage 210. This data may be physically stored on appropriate storage machines/hardware 212, such as a Cloudera environment.

Figure 3:
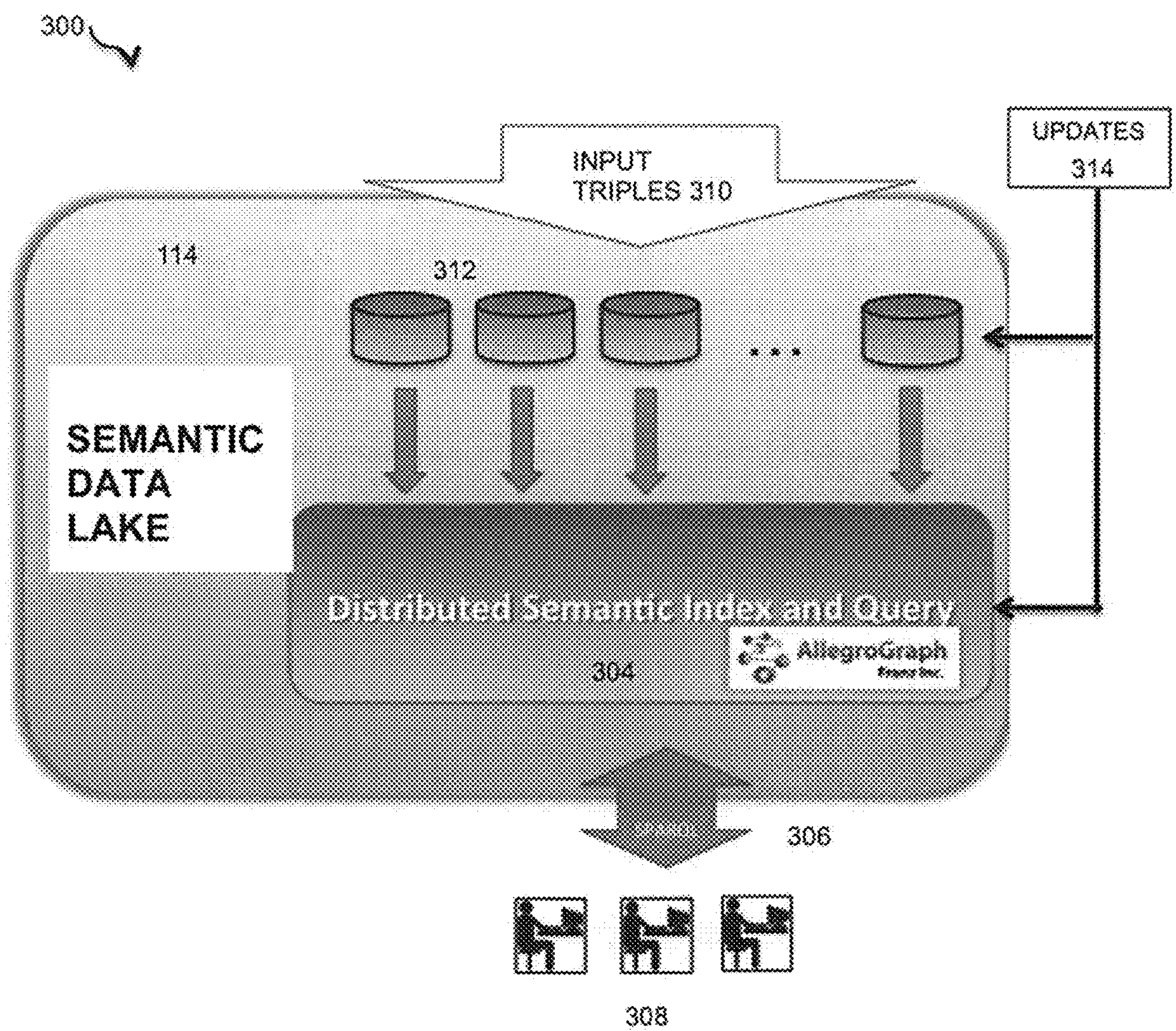
FIG. 3 is a flow diagram that illustrates processing triple store data using a distributed semantic index and query process, under an embodiment.

FIG. 3 is a flow diagram that illustrates processing triple store data using a distributed semantic index and query process, under an embodiment. As shown in diagram 300, input data 310 in the form of an RDF triple is stored in the semantic data lake 114 that comprises HDFS/Cloudera system. The data is stored in a distributed repository 312, such as a Hadoop cluster. The data is then processed by a distributed semantic index and query process 304 that includes an RDF (graph) database, such as Allegrograph. This process provides certain semantic and graph functions, such as distributed indexes, distributed query, semantic indexing, reasoning and rules, ontology enforcement, event model representation and storage, among other functions. A query language 306, such as SPARQL can then be used to perform queries for users 308.

Under an embodiment, any updates of triples or graphs 314 to the data lake can be incrementally added. For example, new triples can be added to both the Hadoop cluster layer 312 or the Allegrograph layer 304. For triples, the process may use an incremental-update workflow where triples are inserted and removed directly from the Hadoop and Allegrograph layers at the same time. For updating single and multiple graphs, the process can remove whole graphs from the Hadoop layer using a UI client or through a MapReduce/Spark job, or similar process, and then build or rebuild the Allegrograph indexes. One example implementation of this embodiment may be a command line (or similar program) that can get/insert/delete/update individual graphs via an interface. In an alternative embodiment, data can be ingested into the data lake comprising the Hadoop and Allegrograph layers in which n-triples sorted by the fourth element are serialized with AVRO and then either written as graphs into Hive or bulk inserted directly into the HDFS as tables for Hive to access.

In an embodiment, the system, such as shown in FIG. 3, distributes RDF triples over a Hadoop cluster with a key value store. An Apache Hive implementation may be used in conjunction with the HDFS to provide a tool for analyzing the unstructured RDF data sets using an SQL-like syntax. In standard implementations, a triplestore data element usually comprises four elements. In an embodiment, the fourth element of an RDF triple is used to partition data to ensure locality through partitioning.

Figures 4, 5:
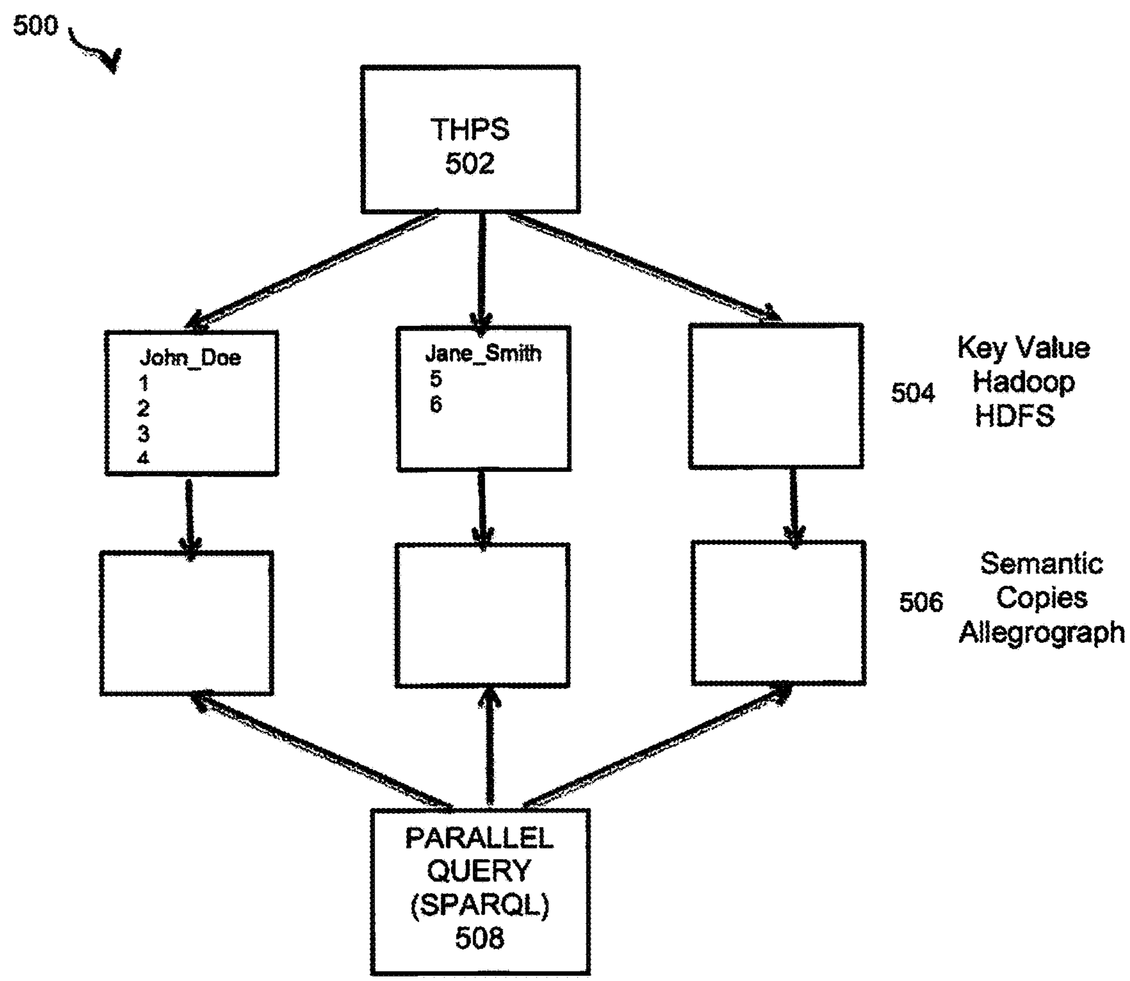
FIG. 4 illustrates the use of an RDF triple structure to partition data using a fourth element, under an embodiment.
FIG. 5 illustrates a method of processing data in Hadoop using Allegrograph as an indexing mechanism, under an embodiment.

FIG. 4 illustrates the use of an RDF triple structure to partition data using a fourth element, under an embodiment. The triple 400 comprises three parts denoted 1, 2, and 3, while the fourth part or element 402 of the triple contains graph context information (UPIs). The use of the fourth element as a data partitioning mechanism is illustrated by an example of six different triples:

| | | |
|---|---|---|
| 1. | person1 has name John | \| John_Doe |
| 2. | event of type_diagnosis | \| John_Doe |
| 3. | event has outcome_2000 | \| John_Doe |
| 4. | outcome_2000 has level_1 | \| John_Doe |
| 5. | event has outcome_2001 | \| Jane_Smith |
| 6. | outcome_2001 has level_2 | \| Jane_Smith |

These six random triples specify certain subject-predicate-object expressions in a standard RDF syntax. The fourth element specifies the name of the person that is the subject of the triple. This data is included as the fourth element of the triple so that in the example shown, the triple data can be partitioned based on the person's name. The graph context 402 thus determines where the triples are stored within the system. Thus, the triples for patient John_Doe will be stored in a first cluster and the triples for patient Jane_Smith will be stored in a second cluster. In this manner, the fourth element of the triple maintains or ensures the locality of the data associated with a particular characteristic of the triple.

As described above, the data is organized by graph-context, thus there could be a graph denoted "john-doe" with one million triples about john-doe. This graph has a key "john-doe" with value set-of-triples (a compressed block of triples). The graphs go into a key/value store in a computer cluster (e.g., a Hadoop cluster). In an embodiment, the triples are processed in a triples hash partition system (THPS) that distributes the triples among a set of servers or nodes. The triples can be distributed evenly among a set of servers or in accordance with a distribution scheme that performs load balancing or optimization processes that allow certain servers to process fewer or more triples. In an embodiment, the graph context element 402 is input into a hash process that generates a hash value of a defined number of digits (e.g., three digits or any other appropriate number). This hash value populates the fifth element 404 of the triple 400, as shown in FIG. 4. Thus, for example, directly from the graph context key, the process calculates a hash-value, which turns a key like "john-doe" into a hash-value like "123". For an example in which the hash value is 3 digits, the hash value can range from 0 to 000, and if there are a number of servers in a cluster (such as ten servers) over which to equally distribute the graphs, the hash values 0-99 can be assigned to server 1, hash values 100-199 can be assigned to server 2, and so on. Again, the distribution can be even, or it can be adapted to facilitate certain characteristics of the system, such as to balance the load, avoid contention, al low quick access to frequently used triples, and so on. The distribution may also be adapted to change over time as the data changes. Similarly, the number of digits for the hash can be tailored to match the requirements and capabilities of the system. In an embodiment, a standard hash function is used to generate hash value element 404 from graph context element 402, but any appropriate hash function may be used. In this manner, the data format mechanism of FIG. 4 allows, in the same cluster, graphs to be sent to Allegrograph server nodes, which index the triples; the hash-values are then used to divide the graphs in a balanced way across the servers (e.g., hash-values 000 to 099 go on server #1, and so on). The system maintains a map that defines which servers get which hash values. In this way, it keeps track of the key to define the Allegrograph server node mapping.

FIG. 5 is a diagram that illustrates a method of processing data partitioned by a triples hash partition system using key value store clusters and semantically indexed clusters as an indexing mechanism, under an embodiment. As shown in FIG. 5, the THPS 502 partitions the data for storage in the appropriate clusters 504. The first set of clusters comprises key value stores in which each item in the database is stored as an attribute name (key) along with its value. For the embodiment of FIG. 5, the 504 clusters may be implemented using the Hadoop file system and Hive language. FIG. 5 illustrates the partitioning of the data provided in the example above with the six random triples. In this case, the triples 1, 2, 3, and 4 for John_Doe are stored in one cluster and the triples 5 and 6 for Jane Smith are stored in a second cluster. The key value stored data 504 is processed to generate semantically indexed copies 506 that are stored in an RDF triplestore, such as Allegrograph. Thus each cluster in layer 506 represents the data in each corresponding cluster of layer 504 as semantically stored. This semantic copy representation facilitates searching of the data using a parallel query engine, such as SPARQL, in which the same query is sent to different self-contained databases and the results are collected. In such a parallel query system, the data is partitioned and each data partition is self-contained and the same query using the parallel query engine is performed against each data partition.

Although embodiments are described in relation to retrieving triples from the Allegrograph layer in response to a query, it should be noted that the Hadoop layer can also be used to retrieve all triples responsive to a query. In some cases, it is faster to use the key-value store on the Hadoop layer to get all the textual triples with only one fast access.

Figure 6:
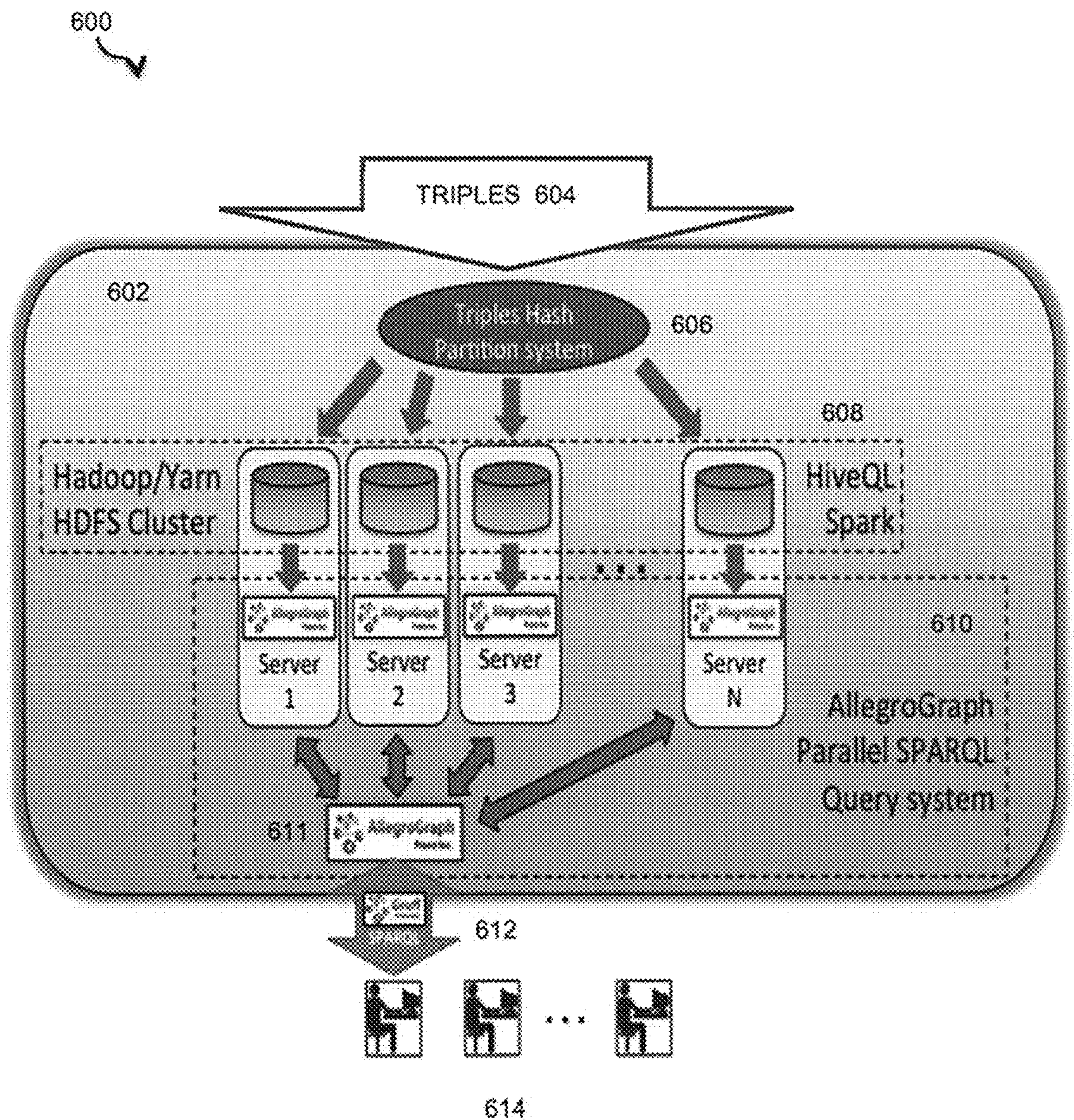
FIG. 6 illustrates a system implementation of the data partitioning and processing arrangement of FIG. 5, under an embodiment.

FIG. 6 illustrates a system implementation of the data partitioning and processing arrangement of FIG. 5, under an embodiment. As shown in diagram 600, triples 604 are input to a THPS process 606 of data partitioning and indexing system 602. The THPS process partitions the data such that triples having a particular partition variable stored in the fourth element are stored in the same machine of a number (n) machines denoted Server 1, Server 2, Server 3, . . . , Server N in FIG. 6. The partitioned data is then stored as key value stores in HDFS cluster layer 608, which also implements the Hive query language to enable other related technologies, such as Spark (machine learning) and SPARQL (semantic queries). In an embodiment, each server (1-N) has an associated RDF triplestore (Allegrograph) that makes up a parallel SPARQL query layer 610. The RDF triplestores store the semantically indexed representation of the key value data for each server. There may be one or multiple RDF triplestores per machine (server). A SPARQL query process 612 performs parallel queries to the machines through a parallel Allegrograph function 611 that interfaces with each individual Allegrograph instance within the Allegrograph system 610 and returns results to the users 614 through a web browser program (e.g., Gruff from Franz, Inc., or similar), or other suitable interface. FIG. 6 illustrates a method of processing THPS-indexed data in Hadoop and Hive using Allegrograph as an indexing mechanism and SPARQL as the semantic query language, but other similar processes or options are also possible.

As shown in FIG. 6, the query engine is a parallel query engine that sends the same query to all of the n machines for simultaneous processing. A second query engine may also be provided, which allows for searches based on cohort selection. In other cases, a federated query engine using combined or joined data sets or databases is used for joined data to allow for queries that are answered by results from multiple machines. For example, a query that asks "give ages of all friends of people over 50 and who have diabetes" will give results from two different sets of data. In general, cohort selection specifies a population with the same characteristic according to some criteria, and results for the query may go outside of a single partition. Either or both of a federated and parallel search engine may be provided so that system 602 thus provides a means to partition data and allow for advanced queries using either a parallel or federated query engine. In an embodiment, in which both query engines are available, choice of which engine to use may be made through manual user or system selection. Alternatively, a process can be incorporated that recognizes a query as impacting a single partition, in which case the parallel engine is used; or as impacting multiple partitions, in which case the federated engine is used. This process may be configured to parse the query and determine whether or not a compound or joined query is present.

Figure 7:
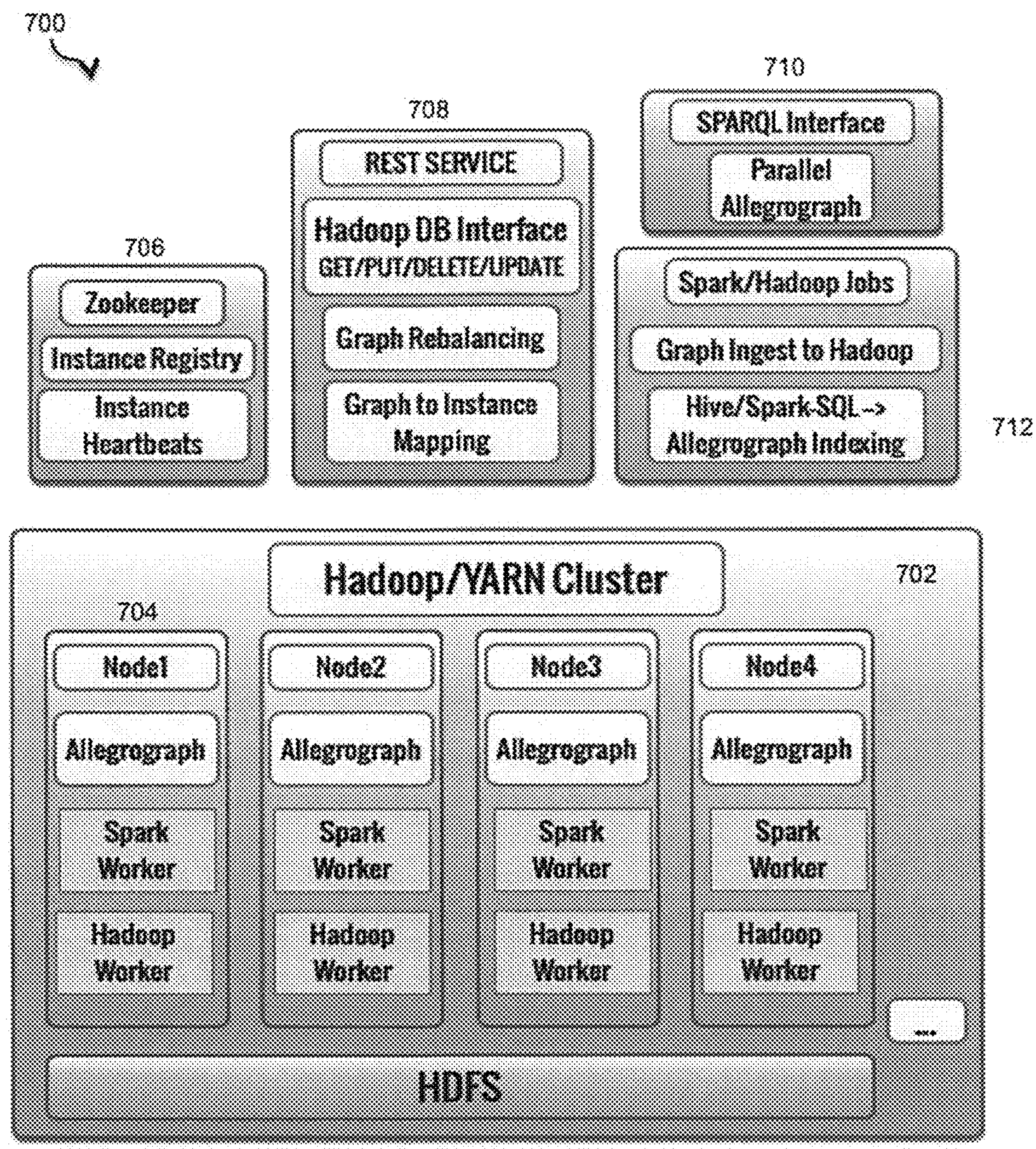
FIG. 7 is an overview diagram illustrating an architecture of a data partitioning and indexing system, under an embodiment.

FIG. 7 is an overview diagram illustrating an architecture of a data partitioning and indexing system, under an embodiment. As shown in FIG. 7, the Hadoop/Yarn cluster layer 702 comprises several nodes 704 (Node1 to NodeN). Yarn refers to a data operating system (cluster resource management) and represents a new generation MapReduce program. Each node has one or more resident RDF triple stores (Allegrographs), a Spark worker module, and a Hadoop worker module to implement the HDFS. Spark refers to a general processing engine that is compatible with Hadoop data and can run in Hadoop clusters through YARN or a standalone mode, and can process data in HDFS, Hive, or other similar format. It is designed to perform both batch processing and functions such as streaming, interactive queries, and machine learning. Other functions illustrated in blocks 706 and 708 may also be provided. These include a zookeeper function that performs certain management and housekeeping functions with regard to RDF triplestore instances, and a graph rebalancing and mapping functions 708. A SPARQL interface 710 is provided to allow parallel queries to the HDFS data, and an Allegrograph indexing process 712 stores the key value data as semantic indexed data.

Figure 8A:
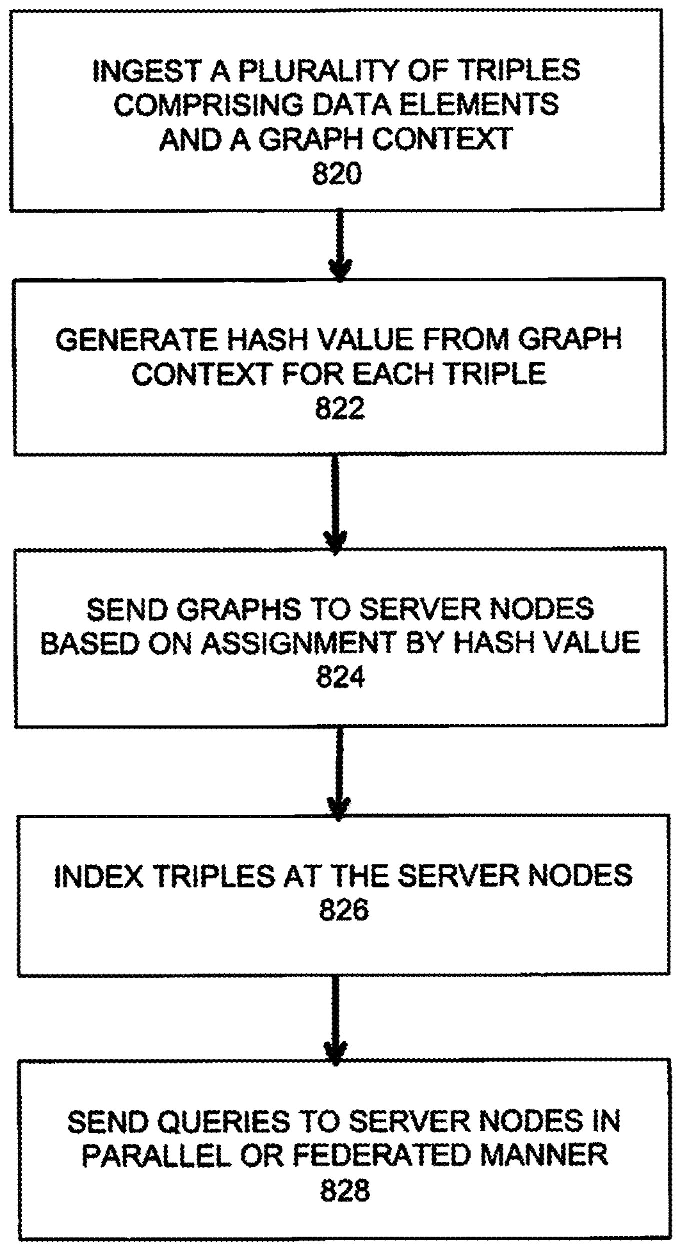
FIG. 8A is a flow diagram that illustrates a method of processing triple data in a semantic data lake process, under an embodiment.

FIG. 8A is a flow diagram that illustrates a method of processing triple data in a semantic data lake process, under an embodiment. In a first step 820, the semantic data lake layer 114 ingests a plurality of triples, which are organized by graph-context, as illustrated in FIG. 4. The graphs go into a key/value store in a computer cluster (typically a Hadoop cluster). A hash value is generated for each triple from the graph-context, step 822. In the same cluster, the graphs are sent to RDF triple store (Allegrograph) server nodes (824), which index the triples (826). As described above, the hash values are used to divide or distribute the graphs in a balanced way across the servers, and the system keeps track of the key-to-Allegrograph server node mapping. Queries can then be sent to the Allegrograph nodes in a parallel or federated way, as described earlier.

In an embodiment, the system can be configured to insert the graphs into the key/value store and determine (or specify) how the key/value store distributes the data across the servers. The system thus learns (or specifies) the key-to-machine mapping from the key/value store; the system can then use the identical mapping for the Allegrograph indexing. This means that when data is indexed from the key/value store into Allegrograph, no data has to move across the network, it is all on the local server, which generally provides much better performance. For analytical tasks, such as machine learning, this can also mean the system provides significantly better performance because it can distribute tasks such that they only use data from the local server. For example, in machine learning one might want to build a predictive model to predict a patient's response to a drug based on historical data. If there are one million patient records, there would likewise be one million tasks to update a predictive model. However, if the system knows the patient-to-machine mapping, then it can send the task for any specific patient to the server that has that patient's data on it. The use of HDFS in an embodiment facilitates this since Hadoop uses this concept to send a task to a Hadoop node which has the data in memory based on a mapping of Hadoop data blocks to nodes. In the present system, a similar process is performed with an extra step of coordinating a query or analytical task with a worker process that will do some processing with an Allegrograph instance which has indexed the data.

For the embodiment above in which the system is configured to insert the graphs into the key/value store, triples can be inserted in either a bulk or real-time manner. In bulk insert, the process proceeds as follows: (1) generate textual triples; (2) store the triples in key-value stores where the key is the fourth element of the triple and the value is all the triples about a subject (e.g., a person or patient); (3) index the data in the key-value store in Allegrograph using the partition based on the fourth element. This processes indexes within Allegrograph and distributes the key-values in accordance with the fourth element partition mechanism. In the real-time insert, the same triple is sent to both the key-value store and the partitioned Allegrograph. In general, the bulk insert method is primarily used for most data updates unless there are many small incremental changes, in which case real-time insert is preferred to update the key-value and Allegrographs at the same time so subsequent queries pick up both updates.

Figure 8B:
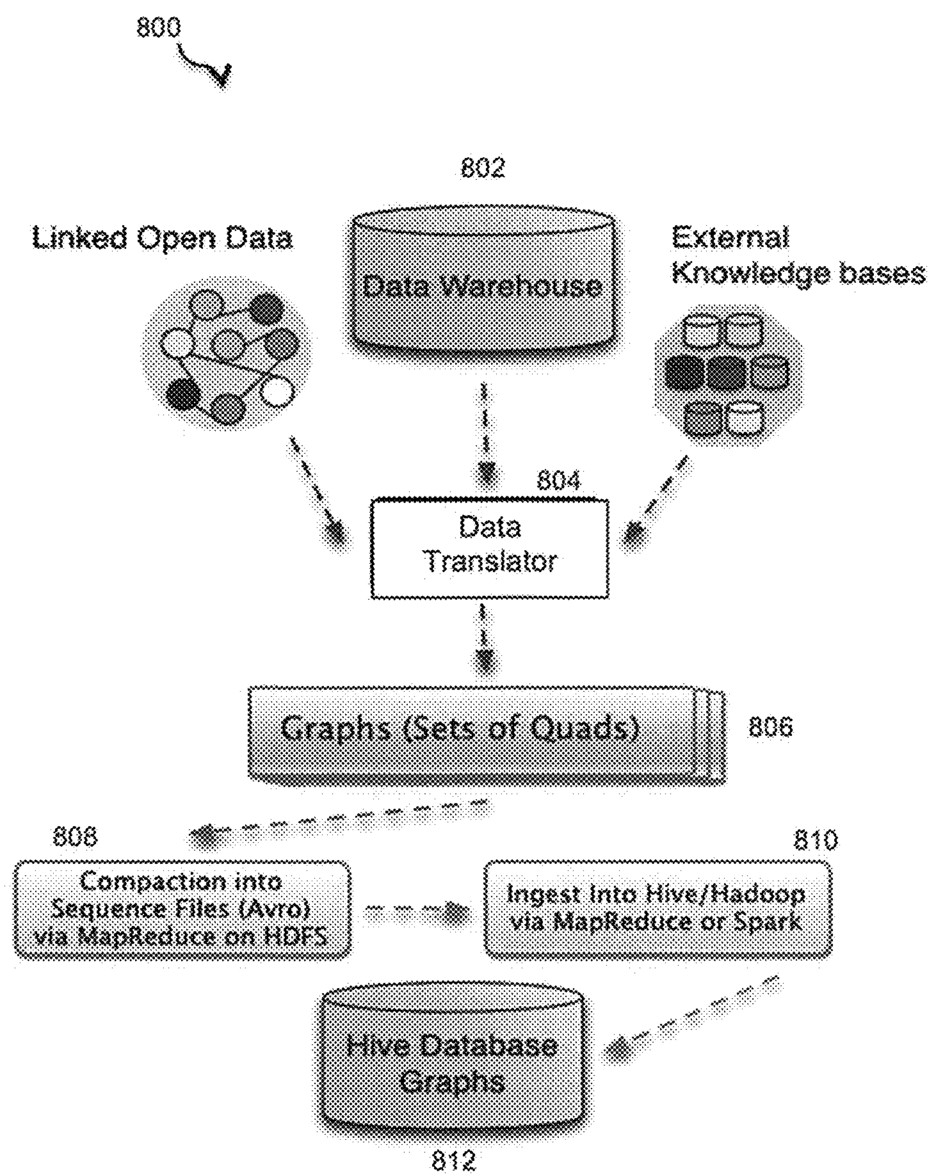
FIG. 8B is a flow diagram that illustrates a method of generating text triples and storing triple data, under an embodiment.
Figure 9:
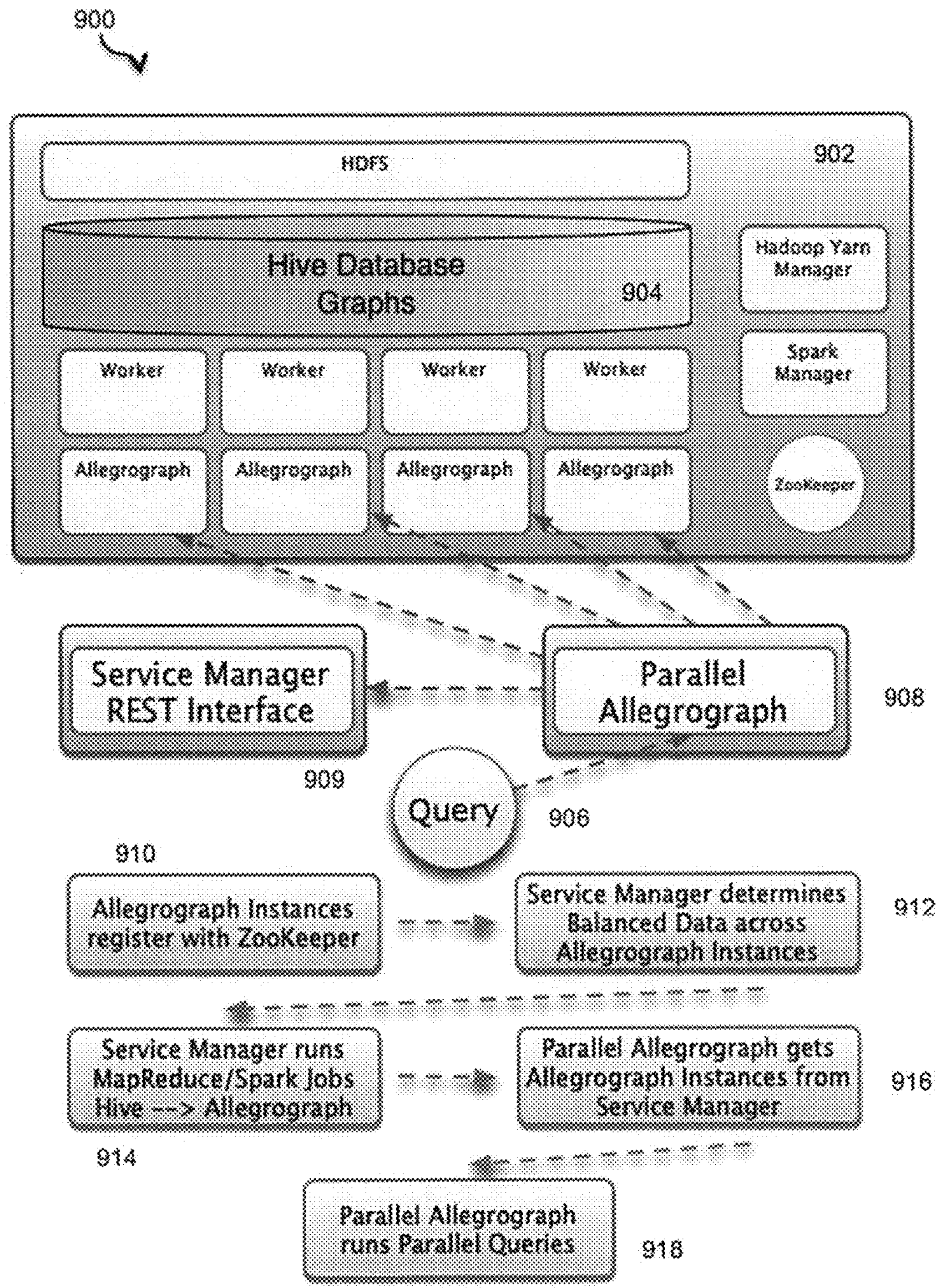
FIG. 9 is a flow diagram that illustrates a method of performing parallel queries on partitioned data, under an embodiment.

FIG. 8B is a flow diagram that illustrates a method of generating text triples and storing triple data, under an embodiment, and FIG. 9 is a flow diagram that illustrates a method of performing parallel queries on partitioned data, under an embodiment. As shown in FIG. 8, data 802 from one or more sources, such as data warehouse, linked open data, or external knowledge bases is provided to a data translator 804. This generates triples in textual form (text triples.) The data is then stored as graphs (sets of quads where fourth element is always the same) 806. The data then undergoes compaction into sequence files, step 808, and input into the HDFS, step 810 for storage in Hive database graphs, 812.

As shown in FIG. 9, the HDFS 902 includes the Hive database graphs 904 and certain functional components (worker/Allegrographs/Managers/zookeeper). Loading of the graphs occurs through process steps 910-918 of diagram 900. In a first step 910, the Allegrograph instances register with the zookeeper. The service manager 909 determines balanced data across Allegrograph instances, step 912. The service manager 909 then runs jobs to convert the key value data (Hive) to RDF triplestore data, step 914. The parallel Allegrograph component 908 then gets Allegrograph instances from the service manager 909, step 916. The parallel Allegrograph then runs the parallel queries 906, step 918.

The embodiment of FIG. 9 illustrates a parallel query search engine that runs the same query simultaneously through separate datasets. As stated earlier, in an alternative embodiment, a federated search engine may also be provided that allows for queries on joined datasets.

UPI Implementation

Embodiments are described in relation to RDF triple-stores, such as Allegrograph. In general, an RDF triplestore stores data in the form of nodes and arcs, where a node represents an entity or instance, and an arc represents a relationship of some type between any two nodes. Graph data may be stored in memory as multi-dimensional arrays or as "tuples" which are finite sequences or ordered lists of objects, each of a specified type. A tuple containing n objects is known as an "n-tuple," where n can be any non-negative integer. A tuple of length 2 (a 2-tuple) is commonly called a pair, a 3-tuple is called a triple, a 4-tuple is called a quadruple, and so on. In typical implementations, triples are stored in memory in the form of "triple-stores." The triple parts (including a unique part identifier and other fields) are all stored as columns in a field, where each field is individually indexed, or indexed as a combination of parts. In an embodiment, each triple part (or tuple part) is encoded into a unique part identifier (UPI), where each UPI comprises a tag at a fixed position. The tag indicates the datatype of the encoded tuple-part. The content data for the tuple part is encoded in a code that is configured to reflect the ranking or order of the content data, corresponding to each data type relative to other tuples in a set of tuples. For content data that comprises a character string, the code comprises a hashcode; and for data that comprises a numeric value, the code comprises an immediate value that directly stores the numeric value. In this manner, each part of the n-tuple is encoded into a unique part identifier (UPI) comprising a tag indicating a data type of the encoded tuple part, and the UPI may comprise a binary representation of very long strings using a unified hashing mechanism to represent the data. UPI representation which may be used according to some embodiments is discussed in more detail in U.S. Pat. No. 7,890,518 issued Feb. 15, 2011, which is assigned to the assignee of the present invention, and which is incorporated by reference in its entirety.

Specific embodiments have been described above in conjunction with certain technologies such as HDFS and MapReduce. However, it should be noted that other file systems and programs that store and process files across multiple machines in a similar cluster-node arrangement can also be used. Likewise, though specific embodiments are described in conjunction with database formats and query languages, other similar database formats and query languages may also be used.

One or more of the components, blocks, processes or other functional components may be implemented through a computer program that controls execution of a processor-based computing device of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

The various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method comprising:

maintaining a set of clusters stored on machines storing each n-tuple as text in a distributed file system using a key value store;

maintaining a semantic data lake component accessing one or more persistent Resource Description Framework (RDF) triplestores for the n-tuple data stored on each machine; wherein one part of each n-tuple is as a partition variable to ensure locality of data within a respective machine of the cluster of machines;

organizing, by a hardware processor, the n-tuples in a graph context by storing key/values of the key value store in the cluster; and generating a hash value for each tuple part from the graph context and within the cluster, wherein graphs of the graph context are sent to each of the triple-store machines, and inserted into the key value store to determine how the key value store distributes data across the machines.

2. The method of claim 1 wherein each n-tuple is a RDF triple comprising four parts, with three parts comprising a subject-predicate-object expression and a fourth part comprising the partition variable.

3. The method of claim 2 wherein each part of the n-tuple is encoded into a unique part identifier (UPI) comprising a tag indicating a data type of the encoded tuple part, and wherein the UPI comprises a binary representation of very long strings using a unified hashing mechanism to represent data.

4. The method of claim 3 wherein the file system is a Hadoop distributed file system (HDFS).

5. The method of claim 2 further comprising partitioning application data of the distributed file system for storage onto a plurality of machines using the fourth part.

6. The method of claim 5 further comprising performing a parallel query on semantic indexed data of the RDF triplestore in each respective machine of the plurality of machines having a separate dataset.

7. The method of claim 6 wherein the key value stores are stored in a Hadoop Distributed File System (RDFS), and the parallel query engine comprises a SPARQL sequential query language based query engine.

8. The method of claim 7 further comprising performing a federated query on the semantic indexed data of the RDF triplestore wherein a query is sent to a machine to access a plurality of connected datasets.

* * * * *